May 5, 1953 J. AVINS 2,637,774
KEYED NOISE-CLIPPING CIRCUIT
Filed Dec. 15, 1950
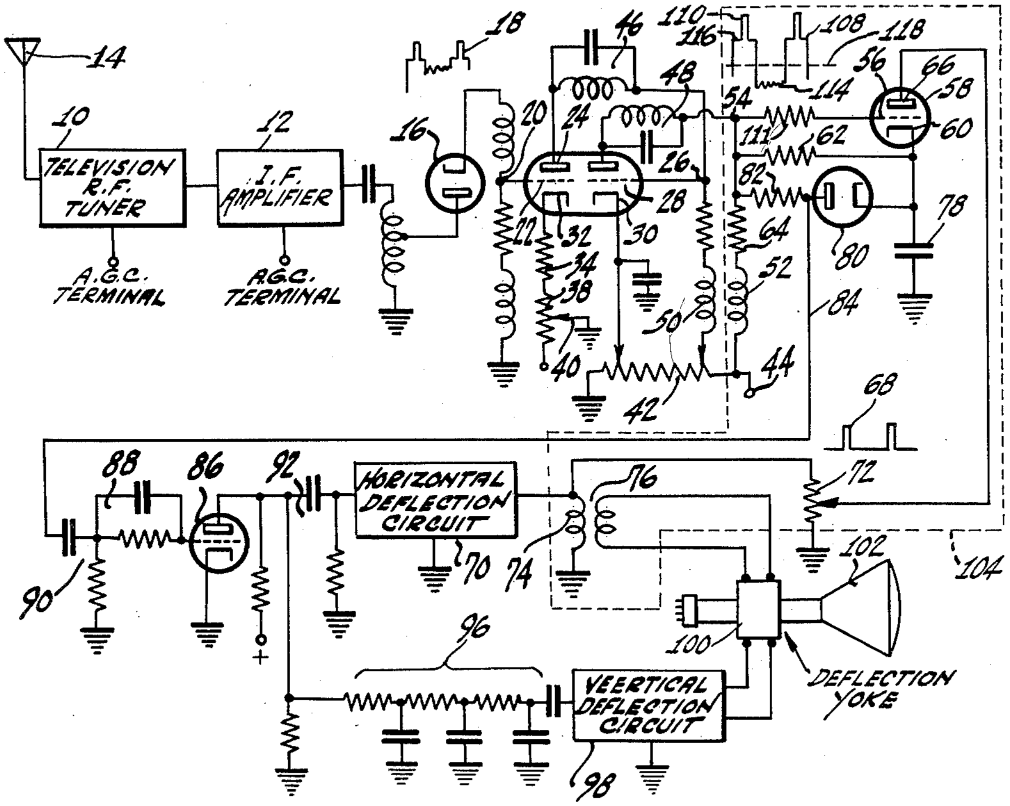
INVENTOR
JACK AVINS
BY [signature]
ATTORNEY Patented May 5, 1953

2,637,774

UNITED STATES PATENT OFFICE 2,637,774

KEYED NOISE-CLIPPING CIRCUIT

Jack Avins, Staten Island, N. Y., assignor to Radio Corporation of America, a corporation of Delaware Application December 15, 1950, Serial No. 200,904

3 Claims. (Cl. 178—7.5)

The present invention relates to improvements in signal processing circuits and more particularly, although not necessarily exclusively, to signal processing circuits of the amplitude discriminatory type which permit passage of only those applied signals having amplitudes falling below a predetermined amplitude level without deleteriously affecting the waveform of the signal so passed.

The present invention relates more directly to a novel signal clipping circuit particularly useful in clipping noise disturbances from electrical signals having recurrent portions of the same relative or nominal amplitude.

In one of its aspects the present invention when applied to the television receiving art provides a novel noise limiting circuit which permits all noise in excess of synchronizing signal peaks to be efficiently clipped without destroying the waveform of the synchronizing signal. In particular the novel precision noise clipping action provided by the present invention is rendered substantially immune to rather large variations in the peak to peak amplitude of the applied signal.

The present invention therefore further relates to the improvements in the design and manufacture of television receiving circuits so as to allow a greater dynamic range of television signal amplitudes to be successfully received and reproduced and so as to provide a greater noise immunity in this signal reproduction.

Perhaps nowhere in the electronic art is the demand greater for precision signal processing at low costs than in the manufacture of television receivers. As is well-known by those skilled in the art the present day standard television signal comprises two main portions which are distinguishable from one another by both waveform and amplitude.

These portions are usually called the synchronizing component and the video component. It is the purpose of the synchronizing component to maintain synchronism between the television transmitter image scanning device and the television receiver signal reproducing device so that the picture elements defined by the transmitter will be properly positioned in the television receiver picture raster. The video component defined by lower amplitude variations of course represents the brightness of each element in the picture as scanned at the transmitter and as reproduction at the receiver takes place.

In television receiving circuits some form of synchronizing signal separator circuit (usually called sync separator circuit) is employed to separate the synchronizing signal component (termed sinc) from the composite television signal. This sync component is then applied to suitable time constant networks which allow the line and frame frequency sync pulses to be separately channeled to the horizontal and vertical deflection generators of the television receiver. Any noise appearing on the top of the sync pulses will, of course, tend to mis-synchronize the deflection circuits and therefore cause undesirable disturbances in the reproduced image.

In the prior art considerable noise immunity in the deflection circuits of the television receiver has been obtained through the careful choice of circuit values used in the design of the sync separator circuit itself. For example, the sync separator circuit generally takes the form of a threshold device which permits passage of only signal information above a certain predetermined amplitude. In the case of the standard television signal the synchronizing component is transmitted at maximum on 100 percent television carrier amplitude while peak video information ranging from white to black in the image is normally transmitted within the limits of 15 percent and 75 percent of the maximum television carrier amplitude. Hence for optimum sync separator action the threshold for the separator must be continually varied in accordance with received signal strength so as to permit only the upper 25 percent of the received signal (representing the sync) to pass to the deflection circuit. Noise peaks therefore tend to make the signal appear stronger than it actually is and therefore cause improper sync separation.

The prior art attempts at solving this problem have been numerous. One of the most common remedial devices is to pass the received demodulated television signal through a clipping stage which clips all signals in excess of a value defined by a control voltage. This control voltage is made a function of the amplitude reached by recurrent peaks of sync signal (representing 100 percent carrier). The development of this control voltage is most commonly accomplished by rectifying the demodulated video signal so that a capacitive load in the rectifier circuit will develop an average voltage representing the peaks of sync. The problem here, however, is that in order to develop the required control voltage in this manner a considerable amount of energy must be taken from the received video signal. This means that in cases where the video signal is developed across high impedance output terminals the energy taken from the signal at peaks of sync to develop this control voltage will tend to distort or "squash" the waveform of the sync signal. In many instances the destruction of the waveform of the sync is as deleterious to the quality of the reproduced picture as if no attempt at noise immunization had been made.

Moreover, it is apparent that in carrying out the prior art noise clipping process the control voltage referred to above must in itself be relatively noise immune otherwise a rather unsatisfactory situation would arise in that the level at which the signal is clipped to eliminate noise is in turn dependent upon the noise itself.

Thus it is an object of the present invention to provide an improved signal processing circuit of the noise clipping variety for use in signal processing systems of the radio receiving type.

It is another object of the present invention to provide a new and improved noise clipping circuit for use in television receiving circuits which permits precision noise clipping at the peaks of the received sync without adversely influencing the waveform of the sync.

It is another purpose of the present invention to provide an improved noise clipping circuit for use in television signal channels adapted to separate the sync component from received composite television signal and especially in which the composite television signal is developed across a high impedance output terminal across which conventional noise limiting systems would produce distortion of the sync waveform.

In the realization of the above objects and features of advantage with particular attention being given to television receiving systems, the present invention contemplates the use of a keyed signal amplifier having a storage capacitor connected in its output circuit. Received television signal is then applied to the input of the amplifier stage and the amplifier stage is in turn keyed on only during the arrival of incoming sync signals. The voltage developed across the storage capacitor then represents the amplitude of incoming sync signals and is relatively immune from noise. The voltage across the storage capacitor is then used as a reference voltage against which a diode may work to clip noise peaks in excess of the peaks of sync derived from the same signal source from which the amplifier is fed. Since the energy for charging the capacitor is not derived from the television signal source considerably less sync waveform distortion is observed than in some prior art systems.

A better understanding of the operation of the present invention, as well as a fuller appreciation of its objects and features of advantage will be obtained through a reading of the following description especially when taken in connection with the accompanying single figure of the drawing in which there is shown a combination block diagram and schematic representation of a television receiving system in which the present invention finds embodiment.

Turning now to the drawing there is shown at 10 a television R. F. tuner followed by an intermediate frequency amplifier 12. The television R. F. tuner receives signals from the antenna 14 which are amplified and superheterodyned between the tuner and intermediate frequency amplifier and finally demodulated by the diode 16. The demodulated video signal 18 then appears at the terminal 20 of the diode load. The terminal 20 is connected with the grid 22 of the first video amplifier 24 whose output at terminal 26 is D. C. coupled to the grid 28 of the second video amplifier 30. The cathode 32 of the first video amplifier 24 is connected through resistance 34 to the contrast control potentiometer 38 whose variable tap 40 is grounded. Proper operating voltages for the D. C. coupled amplifiers 24 and 30 are, of course, provided by suitable connections to the bleeder 42 connected from power supply terminal 44 to ground. The capacitive inductance circuits 46 and 48, as well as inductances 50 and 52 provide well-known frequency compensation in the video amplifiers.

In accordance with the present invention the output terminal 54 of the second video amplifier 30 is connected to the control electrode 56 of an electron discharge tube 58. Tube 58 is connected as a cathode follower type amplifier and by way of example only is shown as a triode. The cathode 60 of tube 58 is connected with ground through the resistor 62, video amplifier load resistor 64, inductance 52 and hence through the bleeder 42. If desired, the resistor 62 may be connected directly to ground. The anode 66 of tube 58 is, in accordance with the present invention, connected to a source of positive going pulses of the type shown at 68. The pulses 68 should be synchronously related with the sync pulses of the arriving television signal and hence may be conveniently derived from the fly back pulses produced in the horizontal deflection circuit 70. This technique for deriving keying pulses of this type is well known in the art and is shown by way of example in an article entitled "Radio Set and Service Review" in the Radio Electronics magazine, November 1950, pages 34 through 36. In the figure this is accomplished by means of a tap resistance or potentiometer 72 connected in shunt with the primary 74 of the deflection output transformer 76. The exact method of obtaining the keying pulses 68 forms no part of the present invention. The pulses 68 are made of sufficient amplitude to cause the tube 58 to be driven into conduction during the interval of the keying pulses.

In further accordance with the present invention a storage capacitor 78 is connected from cathode 60 of discharge tube 58 to ground. A diode 80 is then connected between the output terminal 54 and the cathode 60 of the discharge tube 58 through dropping resistor 82. A noise clipped video signal is then conducted from a connection to resistor 82 by a circuit path 84 to the input of any conventional sync separator circuit such as, for example, discharge tube 86 with its associated time constant networks 88 and 90. This general type of sync separator circuit as well as other suitable sync separator circuits are shown and described in a publication entitled "Basic Television Principles and Servicing" by Bernard Grob, published by the McGraw Hill Co., New York, New York, June 1949. Horizontal sync information is applied through differentiating network 92 to the input of the horizontal deflection circuit 70 while vertical synchronizing information is applied through the integrating network 96 to the input of the vertical deflection circuit 98. The outputs of both the horizontal and vertical deflection circuits are of course both approximately connected to the deflection yoke 100 associated with the kinescope 102. The cathode (not shown) of the kinescope 102 may be coupled with the terminal 54 of the video amplifier tube 30 and video signal modulation of the electron beam in the kinescope.

With the exception of the novel noise clipping circuit of the present invention shown in the dotted line area 104 of the figure, the remaining circuit element thus far described as well as suitable circuits for the block elements shown are indicated in an article entitled "Television Receivers" by Anthony R. Wright, appearing in the RCA Review for March 1947, and also in the above referenced Radio Electronics magazine article.

The novel operation of the present invention, however is substantially as follows. In the figure the composite television signal 108 appearing at the output terminal 54 of the second video amplifier 30 contains several types of information. Among these the first is synchronizing signal information represented by the sync peaks 110; the second is video signal information determined by the waveform 114 appearing between the sync peaks. Thirdly, black level information is represented by the height of the blanking pulses 116. Fourthly, the signal 108 will have an A. C. axis such as 118 whose distance from the level of blanking 116 represents the average brightness of the scene being transmitted (see Television Standards Waveform 1950, pages 1253, November 1950 issue of the IRE Proceedings). This means that the average D. C. potential of the output terminal 54 will vary with respect to ground or a fixed voltage datum in accordance with the average brightness of the scene transmitted. Furthermore, in the particular arrangement shown in the figure, since there is a direct current coupling from the output of the diode 16 to the output terminal 54, the average D. C. potential of the terminal 54 with respect to ground will also vary in accordance with received signal strength. This latter function is, of course, not necessary for the successful practice of the present invention. As will be seen, it is sufficient that D. C. potential of the output terminal 54 vary only in accordance with average scene brightness.

Thus in accordance with the present invention the waveform 108 is applied to the grid 56 of the keyed amplifier 58 through resistance 111. Since the amplifier 58 is keyed "on" only during the positive going extremities of keying pulses 68 (which are in turn in synchronism with the sync pulses 110 of the signal 108) the voltage across the capacitor 78 will always be representative of peaks of sync. This of course is in accordance with well known cathode follower action, the larger the resistance 62 is made the closer the terminal voltage of capacitor 78 will equal the true peak voltage reached by the sync 110. Since the diode 80 is connected from the terminal 54 to the upper terminal of capacitor 78 it will only conduct when the anode of the diode 80 tends to go more positive than the voltage across the capacitor 78. This of course occurs only when noise disturbances tend to create peaks in the terminal 54 which are in excess of peaks of sync 110. Thus diode 80 will conduct only on noise peaks and its conduction current will produce a heavy voltage drop across the dropping resistor 82 so as to produce a very effective noise clipping action. Since the output terminal 54 is connected to the input of the amplifier 58 no energy is required from the second video amplifier to charge the capacitor 78. This charging energy comes solely from the deflection circuit through the agency of keying pulses 68. Since the storage capacitor 78 is in the cathode of the amplifier 58 the capacitor may be made quite large due to the low charging impedance it sees. Hence noise pulses that are by-passed or clipped by the diode 80 will not tend to vary the reference potential or control potential developed across capacitor 78.

Due to the above mentioned fact that the present invention requires no energy per se from the video amplifier to develop the reference potential against which noise clipping action is referenced, the commonly undesirable prior art problem of sync "squashing" is largely eliminated. Sync "squashing" of course in prior art arrangements occurred, as described hereinabove, due to the rather high impedance nature of the video amplifier output circuit so that demands of energy in order to charge a capacitor directly through rectification caused serious voltage drops in the video amplifier output circuit and hence "squashing" or distortion of the sync signal.

Since the amplifier 58 is conducting only for the short duration of the keying pulse 68 corresponding to the arrival of sync information, it can be seen that the reference or control voltage developed across the capacitor 78 is relatively noise immune, i. e. it is not responsive to the occurrence of noise signal between sync pulses.

It is thus seen from the above that the noise limiting circuit of the present invention will provide automatic compensation for changes in received signal level so that noise clipping is always imposed at the peak of sync without producing distortion of the synchronizing signal waveform.

It will be understood in the practice of the above invention it is not necessary to make output terminal 54 reflect both carrier strength and D. C. picture information. Hence it is not necessary to provide complete D. C. coupling from the demodulator diode 16 to the input of the noise immunizing circuit shown in the dotted line area 104. It is only desirable that some means be provided for clamping or otherwise establishing D. C. picture information at terminal 54.

It is obvious that the utility of the signal processing circuit of the present invention is in no way limited to television signal channels. Most any electrical signal having a recurrent maximum amplitude portion which nominally represents datum signal information will be of a nature to benefit from the circuit of the present invention.

Having thus described my invention what I claim is:

1. In a television receiver adapted to receive television signals having a recurrent synchronizing pulse component and comprising a video amplifier having an output terminal, a keyed noise clipper comprising: a unilateral conduction device having an anode, a cathode, and a control electrode, a point of reference potential, a capacitor connected between the cathode of said unilateral conduction device and said point of reference potential, a direct current path including a resistance connected between the cathode of said unilateral conduction device and said point of reference potential, means connecting the output terminal of said video amplifier to the control electrode of said unilateral conduction device so as to apply to said control electrode television signals whose recurrent synchronizing pulse component extends in a positive direction, rectifier means including an anode and a cathode connected between the output terminal of said video amplifier and the cathode of said unilateral conduction device with the cathode and the rectifier means connected to the cathode of said unilateral conduction device, and means to apply to the anode of said unilateral conduction device keying pulses synchronous with the recurrent pulse component of the television signals, said keying pulses having a positive polarity with respect to said point of reference potential.

2. In a television receiver adapted to receive television signals having a recurrent synchronizing pulse component and comprising a video amplifier having an output terminal, a keyed noise clipper comprising: a unilateral conduction device having an anode, a cathode, and a control electrode, a point of reference potential, a capacitor connected between the cathode of said unilateral conduction device and said point of reference potential, a resistor connected in shunt with said capacitor, means including a resistor for connecting the output terminal of said video amplifier to the control electrode of said unilateral conduction device so as to apply to said control electrode television signals whose recurrent synchronizing pulse component extends in a positive direction, rectifier means including an anode and a cathode connected between the output terminal of said video amplifier and the cathode of said unilateral conduction device with the cathode of said rectifier means connected to the cathode of said unilateral conduction device, and means to apply to the anode of said unilateral conduction device keying pulses synchronous with the recurrent pulse component of the television signals, said keying pulses having a positive polarity with respect to said point of reference potential.

3. In a television receiver adapted to receive television signals having a recurrent synchronizing pulse component and comprising a video amplifier having an output terminal, a keyed noise clipper comprising: a normally non-conductive unilateral conduction device having an anode, a cathode, and a control electrode, a point of reference potential, a capacitor connected between the cathode of said unilateral conduction device and said point of reference potential, a direct current path including a resistance connected between the cathode of said unilateral conduction device and said point of reference potential, means connecting the output terminal of said video amplifier to the control electrode of said unilateral conduction device so as to apply to said control electrode television signals whose recurrent synchronizing pulse component extends in a positive direction, a rectifier having an anode and a cathode, a resistor connected between the output terminal of said video amplifier and the anode of said rectifier, a connection between the cathode of said rectifier and the cathode of said unilateral conduction device, and means to apply to the anode of said unilateral conduction device keying pulses synchronous with the recurrent pulse component of the television signals to render conductive said normally non-conductive unidirectional conduction device during the occurrence of said keying pulses, said keying pulses having a positive polarity with respect to said point of reference potential.

JACK AVINS.

References Cited in the file of this patent

UNITED STATES PATENTS

| Number | Name | Date |
|---|---|---|
| 2,356,141 | Applegarth | Aug. 22, 1944 |
| 2,383,420 | Scoles | Aug. 21, 1945 |